Figure 1:
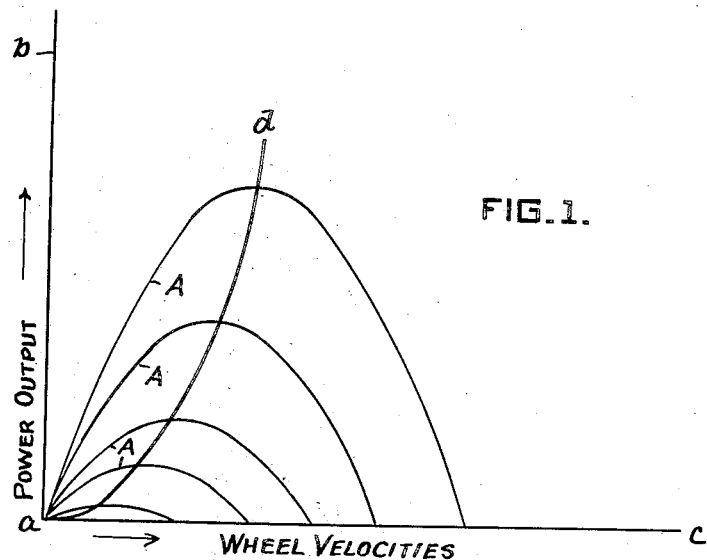

J. A. SNEE, Jr.
VARIABLE POWER REGULATION.
APPLICATION FILED JULY 1, 1918. RENEWED JULY 3, 1920.

1,366,844.

Patented Jan. 25, 1921.

UNITED STATES PATENT OFFICE.

JOHN A. SNEE, JR., OF WEST ELIZABETH, PENNSYLVANIA.

VARIABLE-POWER REGULATION.

1,366,844. Specification of Letters Patent. Patented Jan. 25, 1921.

Original application filed February 16, 1915, Serial No. 8,506. Patent No. 1,271,788, dated July 9, 1918. Divided and this application filed July 1, 1918, Serial No. 242,863. Renewed July 3, 1920. Serial No. 393,985.

*To all whom it may concern:*

Be it known that I, JOHN A. SNEE, Jr., a citizen of the United States, and a resident of West Elizabeth, in the county of Allegheny and State of Pennsylvania, have made new and useful Inventions in Variable-Power Regulations, of which the following is a specification.

This application is a division of my application filed February 16, 1915, Serial No. 8,506.

The primary object of the present invention is to provide for the automatic regulation of variable power prime movers in such manner as to maintain the wheel under the most efficient load regardless of variations in the impelling current, the load increasing and decreasing in approximately exact proportions to increase and decrease of maximum power which can be developed by the wheel in different current velocities.

The useful work done by a current wheel rises from zero at no speed to a maximum at the best or most efficient speed, and drops or recedes to zero at the runaway speed of the wheel. The best speed, *i. e.*, the wheel velocity that produces maximum power, depends upon the size and design of wheel, a matter with which the present invention is not concerned, the assumption being that the most efficient speed for a given wheel has been ascertained and the adjustments made in the light of that knowledge.

When a current wheel is at its best speed for a given current velocity it runs at a given speed, and it delivers a given amount of power. When a wheel is developing maximum power for any current velocity, the torque is aproximately proportional to the square of such velocity, and the output of power is very nearly proportional to the cube of the wind velocity.

The foregoing mathematical facts, well recognized in the art, are made use of herein to accomplish the desired regulation, two opposing forces emanating from or set in motion by the current wheel being utilized, in such manner that one so counteracts the other as to maintain a substantially uniform relation between the load of the wheel and the velocity of the variable impelling wind or water current. One of these governing forces is derived from the torque, or output of power resulting from the operation of the wheel, and this force is utilized to reduce the output of the wheel or the machine driven by it. The other governing force, which opposes the first mentioned force, is derived from the speed of the current wheel or speed of the machine driven by it. This second force is so utilized as to increase the output of the wheel or of the driven machine. The relation of this second force to the speed depends upon the first or output-reducing force; that is to say, it must vary in the same power of the speed as the force which tends to reduce the output. These two opposing forces will balance each other at some speed and output, and in pursuance of the present invention the speed and output are so related that the effect of the opposing governing forces is to always maintain the current wheel at its best speed. And while the speed will be different in different current velocities it will always be that speed that will produce maximum output of work or power from the prevailing current. Having thus ascertained that relation which causes the two opposing regulating forces to vary as the identical function of power of the speed, it remains to so adjust the intensity of one of said forces as to cause the governing forces to always approximately balance each other at the best speed of the wheel.

The principles underlying the invention may be applied by apparatus of many forms and of widely varying construction. Only one of the embodiments are illustrated in the accompanying drawings.

Figure 2:
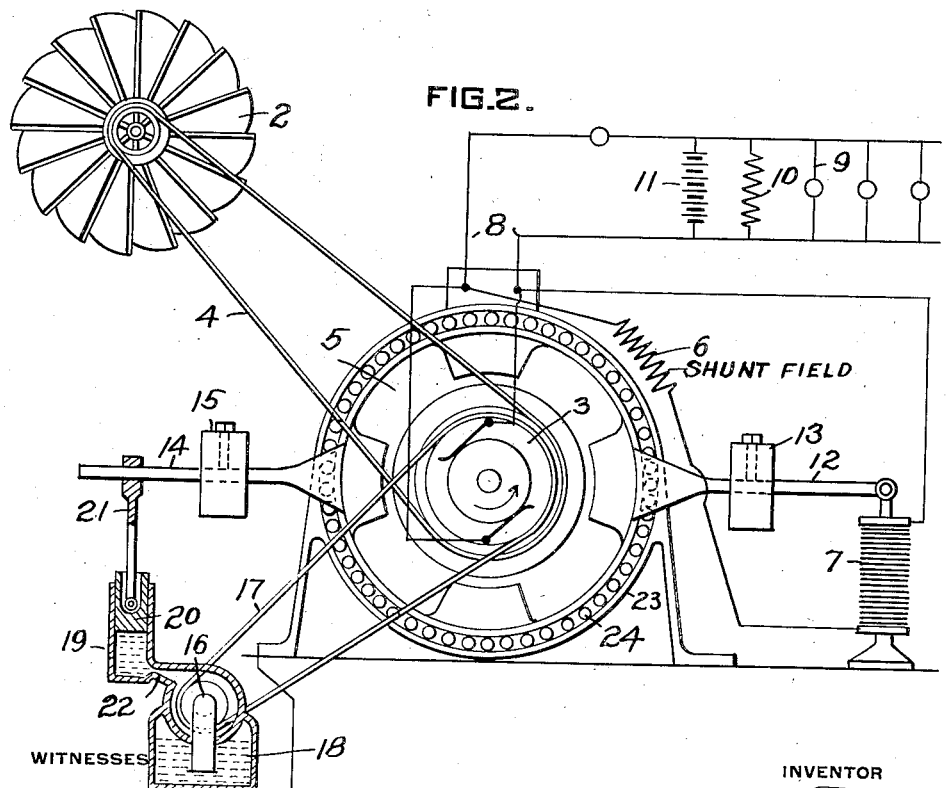

In the drawings, Figure 1 is a diagram illustrating load curves for different current velocities. Fig. 2 is a diagrammatic view of apparatus wherein one of the forces is derived from the torque of the driven machine and the other regulating force is derived from the speed of such machine, the opposing forces being here shown as controlling a resistance in a generator field in such manner that the work performed by the machine is substantially proportional to the cube of the velocity of the impelling current.

In the diagram, Fig. 1, work or output of power represented by vertical line *a—b* is plotted against wheel velocity indicated by horizontal line *a—c*. The parabolic curves A represent work or output of a wheel, or wheel-driven machine, for as many different current velocities. The upwardly curved line a—d, which intersects the highest portion of each curve A, is the line of maximum power which is maintained by means of the present invention. Point a designates no current velocity, and point d maximum current velocity. As the highest part of each curve A is substantially flat, slight departure from the best speed will not noticeably affect the efficiency. If the wheel velocity for any impelling current were to exceed that which is necessary to carry the output to line a—d, i. e., the output of maximum efficiency, the power would decrease with increase of excess speed, and if the excess were sufficiently great the power development would return to zero, as indicated by the descent of curves A from the righthand side of line a—d.

In the apparatus shown in Fig. 2, the load imposed upon the current wheel by a shunt-wound electric generator is so automatically regulated as to maintain the wheel at its most efficient power-developing speed for any and all wheel-impelling currents of sufficient velocity to do useful work. In this adaptation, one of the governing forces is derived from the torque of the generator, and the other and opposing force from the speed of the current wheel. Referring to said view, 2 designates a wheel adapted to be driven by a changeable or variable current, such as wind or water, 3 is the rotor of an electric generator which is geared to wheel 2 (in the conventional illustration by means of belt 4), and 5 is the generator stator. The generator is shunt wound, and in series with its field 6 is a variable resistance 7, here shown of carbon-pile type. In series with the generator leads 8 may be consumers and storers of electric energy of various forms, for instance lamp circuits 9, heating coil 10 or storage battery 11.

Stator 5 is unstable, being mounted to oscillate in housing 23 on roller bearings 24 or other friction preventing devices. Projecting from one side of the stator is arm 12 carrying an adjustable weight 13, and from the opposite side arm 14 provided with a similar weight 15. Arm 12 coöperates with resistance 7, depression of the arm compressing the resistance and increasing the current flow through the field and correspondingly increasing the load, while upward movement of arm 12 results in expansion of the resistance which correspondingly decreses the current flow, with a proportional decrease of load. The elevation of arm 12 is induced by the torque of rotor 3, the amount of torque increasing as the speed increases, with corresponding decrease of current flow through field 6. The force which opposes the torque is transmitted to the stator through arm 14, and may emanate from a centrifugal pump 16 which is geared at 17 to rotor 3, the pump, however, simply acting as a pressure producer in forcing fluid from container 18 into cylinder 19 where the pressure is exerted on piston 20 which is connected by pitman 21 to arm 14. The pitman may have a sliding connection with said arm as shown, so that by moving the pump to either the right or the left, the leverage may be decreased or increased for first adjustment. The pump discharge may be choked at 22 and thereby cause the cylinder and piston to operate as a dash-pot, preventing surging of stator 5. As it is well understood that the pressure produced by a centrifugal pump against a closed discharge is proportional to the square of the speed, such apparatus regulates the torque, keeping it proportional to the square of the speed, thereby providing exactly the force relation herein desired.

Operation: As the available power of a current wheel increases with the cube of the current velocity and as its torque for maximum output increases with the square of such velocity, the desired regulation is accomplished and the wheel is maintained at its best or most efficient speed regardless of the current velocity within reasonable limits, although it will be understood that, as in the case of a wind wheel subjected to a too high wind, means well known in the art may be utilized for turning the wheel out of the wind. The controlling fluid derived from the speed and made effective by pump 16 opposes the force derived from the torque of rotor 2, and the counteraction of each of said forces on the other is such, in view of the mathematical laws herein observed, that the generator at all times imposes a load on the wheel which is proportional to the cube of the wind velocity, and this necessarily results in maintaining the wheel at its most efficient power-developing speed. Increase of speed increases the force exerted by pump 16, causing that force to dominate the force derived from the torque, and the resulting compression of resistance 7 increases the current flow through the field with corresponding increase in generator load imposed upon the wheel, and the slowing down of the latter decreases the pump pressure until the opposed governing forces are again in balance. Similarly, if the load is decreased, as by cutting out one or more of the consuming devices, the tendency to increase the speed under the lighter load puts the governing forces at once in action and the equilibrium is restored. Weights 13 and 15 are useful in making the initial adjustments, and it will be understood that resistance 7 as well as other parts of the controlling mechanism must be proportioned to the particular size and type of current wheel and generator in connection with which they are used.

Having thus described my invention what I claim is—

1. The combination with a variable speed prime mover, of an electric generator the rotor element of which is operatively connected with said prime mover, means for mounting the field of said generator so as to allow rotation thereof, means for producing a force which is a function of the speed of such mover, and means for producing a force which is a function of the torque of such mover, such means being so correlated that said forces will tend to balance one another and the load on the prime mover be regulated in accordance with the point of balance.

2. The combination with a fluid motor operating under varying fluid velocities, of an electric generator the rotor of which is operatively connected to such motor while its stator is mounted for oscillation about the generator axis, a resistance in the generator field, means connected with the generator stator for varying said resistance in accordance with the torque of the motor and a centrifugal device operatively connected to the generator rotor for opposing oscillation of the generator stator.

3. The combination with a fluid motor adapted to operate with varying fluid velocities, means for producing a force which is proportional to the square of the motor velocity, means for producing a force which is proportional to the torque of the motor and an electric generator so correlated with said means as to balance said forces against each other in such manner that when the balance is reached for any particular velocity the motor runs at a predetermined speed.

4. The combination with a fluid motor adapted to operate with varying fluid velocities, of a shunt wound generator the rotor element of which is operatively connected with said motor, a variable resistance for the generator field, means dependent upon the torque of said motor for controlling said resistance, and means the operation of which is dependent upon the speed of said motor for affecting the control of said resistance.

5. The combination with a fluid motor adapted to operate with varying fluid velocities, of an electric generator having a rotor, and a stator mounted for oscillation about the rotor axis, means operatively connecting the rotor with said motor, resistance in the field circuit, means connected to the generator stator for varying said resistance, a centrifugal device operatively connected with the generator rotor, and means connected with the generator stator and operated by said centrifugal device for opposing oscillation of the generator stator.

In testimony whereof, I have hereunto subscribed my name this 26th day of June, 1918.

JOHN A. SNEE, Jr.